No. 886,552. PATENTED MAY 5, 1908.
W. THOMAS.
GAS PRESSURE GAGE.
APPLICATION FILED APR. 11, 1907.
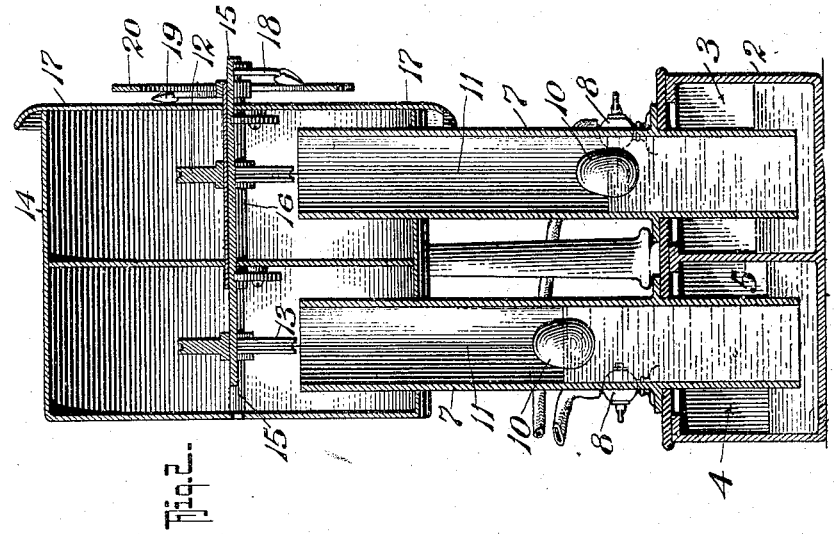
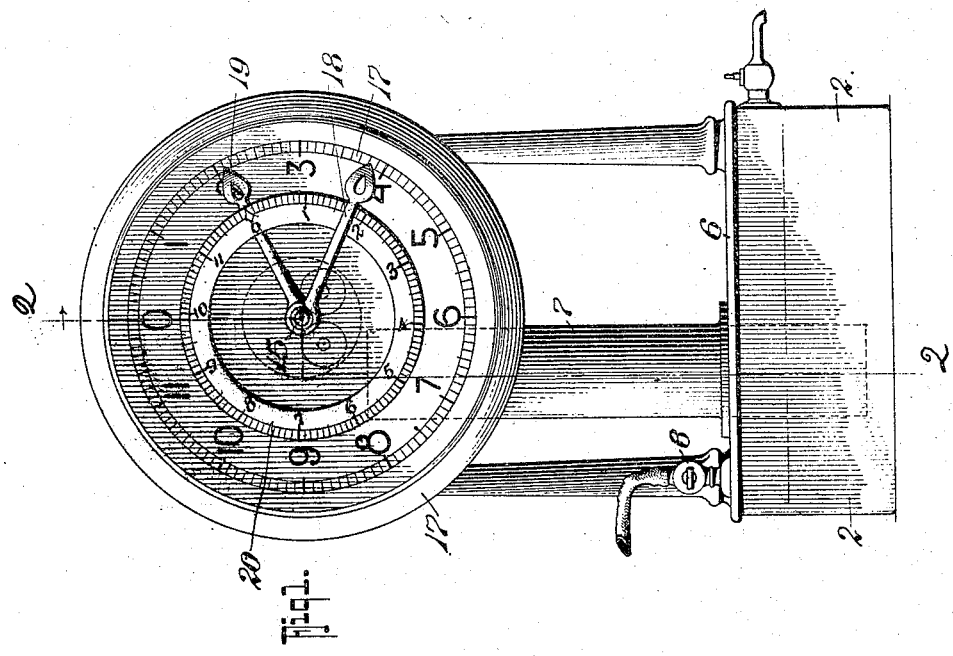
WITNESSES:
John T. Schrott
H. Woodard.
INVENTOR
Walter Thomas
BY
Fred G. Dieterich
ATTORNEY

UNITED STATES PATENT OFFICE.

WALTER THOMAS, OF VANCOUVER, BRITISH COLUMBIA, CANADA.

GAS-PRESSURE GAGE.

No. 886,552.

Specification of Letters Patent.

Patented May 5, 1908.

Application filed April 11, 1907. Serial No. 367,561.

*To all whom it may concern:*

Be it known that I, WALTER THOMAS, a citizen of the Dominion of Canada, residing at Vancouver, in the Province of British Columbia, Canada, have invented a new and useful Improvement in Gas-Pressure Gages, of which the following is a specification.

This invention relates to a gas pressure indicating gage and is designed as an improvement to a gage of that class known as "King's" pressure gage wherein the gas, the pressure of which it is desired to ascertain, is admitted to an inclosed chamber partially filled with water, mercury, or other suitable liquid into which dips the lower end of a vertical tube open to the atmosphere, so that the liquid in the vessel rises and falls in the vertical tube as the pressure within the inclosed chamber increases or lessens. The variation of the pressure is indicated on a graduated scale by a pointer operated from a float on the liquid in the vertical tube.

In various industries it is frequently desirable to have under close observation the difference of pressure of gas or air in adjacent pipes or vessels and the present practice is to ascertain the pressure of each and subtract one from the other.

My invention is therefore directed to the provision of a compound differential gage wherein two gages of the class described are applied together and their floats operate indicators or pointers and an annular dial independently movable on a common axis and over a common dial so that the difference of pressure in two pipes or vessels or in different parts of the same pipe or vessel may be determined at a glance.

The invention is fully described in the following specification and illustrated in the drawings by which it is accompanied, in which:

Figure 1 is a front elevation, and Fig. 2 a vertical section on the line 2—2 in Fig. 1.

In these drawings 2 represents an inclosed vessel which is divided into two separate compartments 3 and 4 by a vertical partition 5. These compartments are partially filled with water, mercury, or other suitable liquid and into each compartment vertical tubes 7 project through the cover 6 of the vessel. The lower end of each tube 7 extends to within a short distance of the bottom and below the level of the liquid in the compartments and each upper end is open to the atmosphere. A gas connection, from each source the pressures of which it is desired to compare, is made to each compartment 3 and 4 through the intervention of stopcocks 8. Thus when the gas pressure is admitted to the compartments 3 or 4 it will act upon the surface of the liquid in each and will force it up the vertical tubes to a height above the level of the liquid in the compartment corresponding to the pressure of the gas in each compartment.

In each vertical tube is a float 10 which floats are connected by flexible cords 11 to sheaves 12 and 13. The sheave 13 to which the float of the back compartment 4 is connected is secured on a light shaft or arbor 15 rotatable in a light frame or casing 14 inclosing the mechanism and supported at a convenient height above the vessel 2 which forms the base of the device, and the sheave 12 to which the flexible cord of the front compartment 3 is connected is secured to a sleeve 16 rotatable on the arbor 15.

To the front end of the arbor 15, outside of the dial 17 which forms the front of the casing 14 is secured a pointer 18 which will thus indicate on the graduations of the dial 17 the elevation or depression of the float caused by fluctuations of the gas pressure in the back compartment 4; and to the front end of the sleeve 16 to which the float of the forward compartment 3 is connected, is secured a pointer 19 and a dial ring 20 having graduations angularly corresponding to those of the fixed dial 17. This pointer 19 will therefore indicate on the dial 17 the pressure in the front compartment 3 and the difference between the angular positions of the two pointers will indicate the difference between the pressures in the compartments which difference may be read off on the dial ring 20, which moves with the pointer 19. To facilitate adjustment of the pointers 18 and 19 they are frictionally attached to the arbor and to the sleeve respectively.

In order to reduce friction the sleeve 16 instead of taking its bearing on the arbor 15 may be mounted on small roller bearings in the manner shown by dotted lines in Fig. 1, or both arbor 15 and sleeve 16 may be so mounted, but this feature is not material to the invention which particularly relates to the application of the two gages to indicate their fluctuations on a common dial and to the dial ring on one of the pointers whereby differences of pressure may be read off.

Having now particularly described my invention and the manner of its operation, I hereby declare that what I claim as new and desire to be protected in by Letters-Patent is:

1. In a gas pressure gage of the class described, a pair of adjacent closed vessels, open ended tubes projecting through the top of each vessel and terminating adjacent to the bottom thereof, means for admitting gas into the vessels, means for indicating on a common scale the independent rise and fall in the vertical tubes of a liquid within each vessel, and supplemental means for indicating the difference of pressure in the vessels.

2. In a gas pressure gage, a pair of vessels, floats held therein, means coöperating with each float for indicating the rise and fall of the float, a common dial coöperating with said means to indicate the independent rise and fall of the floats, and a second dial coöperating with said indicating means to indicate the difference between the rise and fall of the floats.

3. In a gas pressure gage of the class described, adjacent closed vessels, vertical tubes opened to the atmosphere projecting downward through the top of each vessel, said tubes terminating a short distance above the bottom, means for admitting gas to within the vessels, a float in each vertical tube, pointers coaxially supported and independently movable, means for connecting the floats to said pointers, a graduated dial plate and a dial ring secured to one of said pointers, said dial ring having graduations to correspond with the dial plate, substantially as shown and described.

In testimony whereof I have signed my name to this specification in the presence of two subscribing witnesses.

WALTER THOMAS.

Witnesses:
ROWLAND BRITTAIN,
CLIVE S. CARMAN.